(12) United States Patent
Thangadorai et al.

(10) Patent No.: US 9,430,177 B2
(45) Date of Patent: Aug. 30, 2016

(54) METHOD AND APPARATUS FOR PROVIDING AN ENHANCED WI-FI DISPLAY SESSION IN A WI-FI DISPLAY NETWORK, AND SYSTEM THEREOF

(71) Applicant: Samsung Electronics Co., Ltd., Gyeonggi-do (KR)

(72) Inventors: Kavin Kumar Thangadorai, Bangalore (IN); Mohammed Inthiqab, Bangalore (IN); Srikrishna Sadula, Bangalore (IN); Vaibhav Khandelwal, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 488 days.

(21) Appl. No.: 13/792,484

(22) Filed: Mar. 11, 2013

(65) Prior Publication Data

US 2013/0234913 A1 Sep. 12, 2013

(30) Foreign Application Priority Data

Mar. 11, 2012 (IN) .............................. 901/CHE/2012
Feb. 19, 2013 (IN) .............................. 901/CHE/2012

(51) Int. Cl.
*G06F 3/14* (2006.01)
*H04L 29/06* (2006.01)
*H04W 4/06* (2009.01)

(52) U.S. Cl.
CPC .......... *G06F 3/1423* (2013.01); *H04L 65/1069* (2013.01); *H04L 65/4076* (2013.01); *H04W 4/06* (2013.01)

(58) Field of Classification Search
CPC ................... H04N 21/43637; H04N 21/4126; H04L 65/608; H04L 65/4092; H04W 8/005
See application file for complete search history.

(56) References Cited

U.S. PATENT DOCUMENTS

| 5,852,472 A | 12/1998 | Prasad et al. |
|---|---|---|
| 7,995,143 B2 | 8/2011 | Christison et al. |
| 2005/0157660 A1 | 7/2005 | Mandato et al. |
| 2008/0168519 A1 | 7/2008 | Rao et al. |
| 2008/0226119 A1* | 9/2008 | Candelore et al. ........... 382/100 |

(Continued)

OTHER PUBLICATIONS

Mathy, Laurent, et al.; "QoS Negotiation for Multicast Communications;" International COST 237 Workshop Proceedings, vol. 882; Nov. 13, 1994; pp. 199-218; XP019197198.

(Continued)

*Primary Examiner* — Jung Park
(74) *Attorney, Agent, or Firm* — Cha & Reiter, LLC

(57) ABSTRACT

An apparatus and method for providing an enhanced Wireless Fidelity (Wi-Fi) display (WFD) session in a WFD network, and system thereof. Once a WFD connection is setup, a WFD source device broadcasts a WFD capability request frame to multiple WFD sink devices over the WFD connection. In response, each of the WFD sink devices sends a WFD capability response frame to the WFD source device. The WFD capability response frame contains capability information and audio and video intent value associated with the respective WFD sink devices. The WFD source device consolidates a sink property table using the capability information and the audio and video intent value associated with respective WFD sink devices. The WFD source device establishes a WFD session with the multiple WFD sink devices. The WFD source device streams multimedia content to the WFD sink devices in a multicast manner.

20 Claims, 13 Drawing Sheets

(56) References Cited

U.S. PATENT DOCUMENTS

| | | |
|---|---|---|
| 2008/0291891 A1 | 11/2008 | Jerlhagen et al. |
| 2009/0274326 A1 | 11/2009 | Jia et al. |
| 2010/0235483 A1 | 9/2010 | Kambhatla |
| 2011/0107388 A1 | 5/2011 | Lee et al. |
| 2013/0139210 A1* | 5/2013 | Huang et al. ............. 725/109 |
| 2013/0195119 A1* | 8/2013 | Huang et al. ............. 370/468 |

OTHER PUBLICATIONS

"Wi-Fi Alliance Member Symposium" Apr. 2011; XP 055046396; [http://www.wi-fi.org/files/20110421_China_Symposia_full_merge.pdf Rtvd from internet on Dec. 3, 2012] *Scanned in 3 parts; total of 328 pgs.*

* cited by examiner

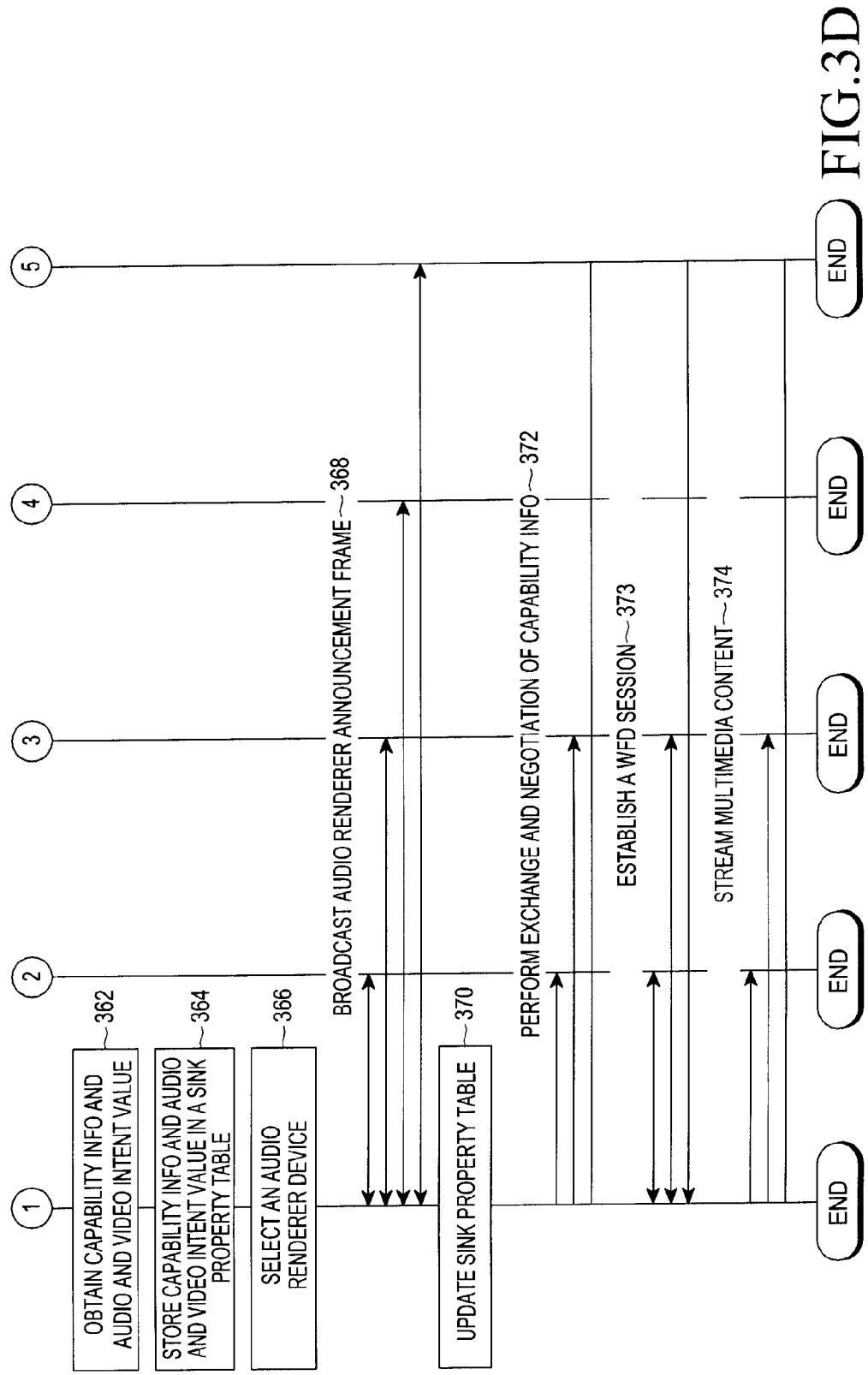

| WFD SINK DEVICES | DEVICE 1 | DEVICE 2 | DEVICE 3 | ... | DEVICE N |
|---|---|---|---|---|---|
| AUDIO INTENT (802) | 0 | 4 | 9 | ... | 10 |
| VIDEO INTENT (804) | 5 | 0 | 9 | ... | 10 |
| CAPABILITY (806) | V | A | AV | ... | AV |
| ROLE (808) | V | NULL | V | ... | A* |
| AVAILABILITY (810) | 1 | 1 | 1 | ... | 1 |
| AUDIO CODECS (812) | LIST | LIST | LIST | LIST | LIST |
| VIDEO CODECS (814) | LIST | LIST | LIST | LIST | LIST |

METHOD AND APPARATUS FOR PROVIDING AN ENHANCED WI-FI DISPLAY SESSION IN A WI-FI DISPLAY NETWORK, AND SYSTEM THEREOF

CLAIM OF PRIORITY

This application claims the benefit of priority under 35 U.S.C. §119(a) from an Indian Provisional Patent Application Serial No. 901/CHE/2012 filed in the India Patent Office on Mar. 11, 2012, and an Indian Complete Patent Application filed in the Indian Patent Office on Feb. 19, 2013 which was assigned Serial No. 901/CHE/2012, the contents of which are incorporated herein by reference.

BACKGROUND OF THE INVENTION

1. Field of the Invention

The present invention relates to the field of wireless display systems. More particularly, the present invention relates to a method and apparatus for providing an enhanced Wireless Fidelity (Wi-Fi) display session in a Wi-Fi display network, and system thereof.

2. Description of the Related Art

Recently, a wireless fidelity (Wi-Fi) display (WFD) standard has been newly defined based on a requirement to transmit audio/video (AV) data while satisfying high quality and low latency. A WFD network is a network system that may comply with certain standards promoted by the Wi-Fi Alliance® in order to enable Wi-Fi devices to be connected to each other in a peer-to-peer fashion without participating in a home network, an office network, or a hot-spot network. WFD devices within a WFD network can discover information regarding each other, e.g., capability information, establish a WFD session, and render content received during the WFD session. Typically, a WFD network comprises a WFD source device and either one or two WFD sink devices.

Today a WFD source device can discover and establish a WFD session with only either one or two WFD sink devices, namely a WFD primary sink device and a WFD secondary sink device. A WFD source device acts as a multi-media content provider device. A WFD primary sink device can render both audio and video streams whereas a WFD secondary sink device can render audio stream. The WFD source device wirelessly transmits audio and/or video streams to the WFD primary sink device and audio streams to the WFD secondary sink device. The primary and WFD secondary sink devices decode the streams and render the decoded stream on its output unit (e.g., display, speakers, etc.). A coupling may be optionally required to be established between the primary sink device and the WFD secondary sink device for rendering multimedia content. Currently, a WFD source device can stream video and/or audio content to a single WFD primary sink device and audio content to a single WFD secondary sink device. However, if a user wishes to render video and/or audio content on multiple WFD primary sink device and multiple secondary sink devices, the WFD source device may not enable the user to stream multimedia content on multiple primary and secondary sink devices, thereby causing inconvenience to the user. There is a need in the art to permit a user to stream multimedia content on multiple primary and secondary sink devices.

SUMMARY OF THE INVENTION

An aspect of the present invention is to address at least some of the problems and/or disadvantages and to provide at least the advantages described below.

Accordingly, an aspect of the present invention is to provide a method of multicasting multimedia streaming content to a plurality of WFD sink devices in a Wireless Fidelity Display (WFD) network. The method preferably includes setting up a WFD connection with a plurality of WFD sink devices in a WFD network by a WFD source device; broadcasting a WFD capability request frame to the plurality of WFD sink devices over the WFD connection; receiving a WFD capability response frame from each of the plurality of WFD sink devices in response to the WFD capability request frame, wherein the WFD capability response frame comprises capability information and an audio and video intent value; establishing a WFD session between the WFD source and multiple WFD sink devices in the plurality of WFD sink devices based on the capability information and the audio and video intent values; and streaming multimedia content to the multiple WFD sink devices during the WFD session.

Accordingly, an aspect of the present invention is to provide an apparatus of multicasting multimedia streaming content to a plurality of WFD sink devices in a Wireless Fidelity Display (WFD) network. The apparatus preferably includes a control unit, and a Wi-Fi module communicatively coupled to the control unit. The control unit is configured for: setting up a WFD connection with a plurality of WFD sink devices; broadcasting a WFD capability request frame to the plurality of WFD sink devices; receiving via the Wi-Fi module, a WFD capability response frame comprising capability information and an audio and video intent value from each of the plurality of WFD sink devices; establishing a WFD session with multiple WFD sink devices in the plurality of WFD sink devices based on the capability information and the audio and video intent value; and streaming multimedia content to the multiple WFD sink devices during the WFD session.

Accordingly, an aspect of the present invention is to provide a system of multicasting multimedia streaming content to a plurality of WFD sink devices in a Wireless Fidelity Display (WFD) network. The system preferably includes a WFD source device, and a plurality of WFD sink devices. The WFD source device is configured to set up a WFD connection for wirelessly communicating with a plurality of WFD sink devices in a WFD network, broadcast a WFD capability request frame to the plurality of WFD sink devices over the WFD connection, receive a WFD capability response frame from each of the plurality of WFD sink devices in response to the WFD capability request frame, wherein each WFD capability response frame comprises capability information and an audio and video intent value of a respective WFD sink device of the plurality of WFD sink devices, establish a WFD session with multiple WFD sink devices among the plurality of WFD sink devices based on the capability information and the audio and video intent value from a respective WFD capability response frame from the multiple WFD sink device, and stream multimedia content to the multiple WFD sink devices during the WFD session.

BRIEF DESCRIPTION OF THE DRAWINGS

The above and other exemplary objects, features and advantages of certain exemplary embodiments of the present invention will become more apparent from the following detailed description taken in conjunction with the accompanying drawings, in which:

FIGS. 3C and 3D are sequence diagrams depicting example interactions between a WFD source device and multiple WFD sink devices to multicast audio content and unicast video content, according to yet another exemplary embodiment of the present invention;

Figure 1:
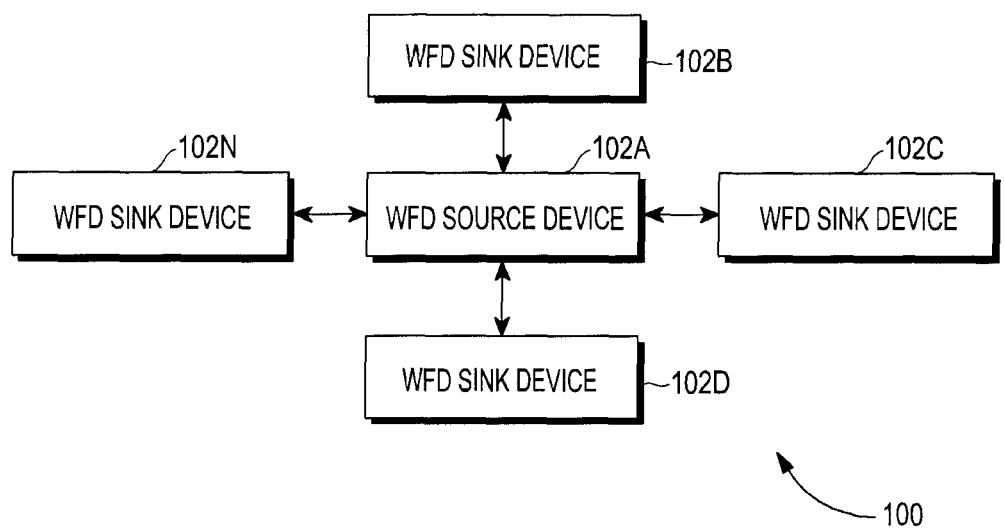
FIG. 1 is a diagrammatic view of a Wireless Fidelity (Wi-Fi) display (WFD) system with multiple WFD sink devices, according to an exemplary embodiment of the present invention.

The drawings described herein are for provided for illustrative purposes only and are not intended to limit the scope of the claimed invention in any way.

DETAILED DESCRIPTION

The present invention is described herein below with respect to particular exemplary embodiments and with reference to certain drawings, but the claimed invention is not limited thereto, and rather, is set forth only by the claims.

The drawings described are illustrative and are non-limiting. In the drawings, for illustrative purposes, the size of some of the elements may be exaggerated and not drawn to a particular scale. Where the term "comprising" is used in the present description and claims, said term does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, if used in the description and in the claims, are provided for distinguishing between similar elements and not necessarily for describing a sequential or chronological order. It is to be understood that the terms so used are interchangeable under appropriate circumstances (unless clearly disclosed otherwise) and that the embodiments of the invention described herein are capable of operation in other sequences and/or arrangements than are described or illustrated herein.

Finally, all the exemplary devices mentioned herein (laptop, LCD tv, speaker unit, MP3 player, mobile phone) are provided merely for illustrative purposes and the claims are in no way limited to these exemplary device or their equivalents.

The present invention provides a method and system for providing an enhanced Wireless Fidelity (Wi-Fi) display (WFD) session in a Wi-Fi display network. In the following detailed description of the exemplary embodiments of the invention, reference is made to the accompanying drawings that form a part hereof, and in which are shown by way of illustration specific exemplary embodiments in which the invention may be practiced. These embodiments are described in sufficient detail to enable those skilled in the art to practice the invention, and it is to be understood that other exemplary embodiments may be utilized and that changes may be made without departing from the spirit of the present invention and the scope of the appended claims. The following detailed description is, therefore, not to be taken in a limiting sense, and the scope of the present invention is defined only by the appended claims.

FIG. 1 is a diagrammatic view of a Wi-Fi display (WFD) system 100 with multiple WFD sink devices 102B-N, according to an exemplary embodiment. In particular, the WFD system 100 includes a plurality of WFD devices 102A-N. The WFD devices 102A-N may include devices supporting Wi-Fi protocol including but limited to a display device, a printer, a digital camera, a projector, a laptop, a smart phone, a tablet, a phablet, television, media player, portable gaming console and other Wi-Fi display certified devices, just to name a few non-limiting possibilities. The artisan should also understand and appreciate that being WFD certified is not a determinant as to whether or not the present claims are applicable, and the capability to communicate with other devices as described herein, certified or otherwise, that permit practicing the claimed invention without undue experimentation. The WFD devices 102A-N may be directly connected to each other without using a Wireless Local Area Network (WLAN) Access Point (AP). For example, there can be an ad hoc network or a peer-to-peer arrangement.

For the illustrative purposes, it is presumed that the WFD device 102A comprises a WFD source device and the Wi-Fi devices 102B, 102C, 102D to 102N preferably comprise WFD sink devices. The WFD sink devices 102B-N are categorized as WFD primary sink devices and WFD secondary sink devices. The WFD source device 102A is capable of discovering WFD sink devices 102B-N, establishing a direct connection with the WFD sink devices 102B-N and streaming multi-media content (audio and/or video data) to the WFD sink devices 102B-N over a WFD session in a unicast as well as multicast manner. The WFD primary sink devices preferably include WFD devices which have been adapted to render both audio and video data received from the WFD source device 102A, whereas the WFD secondary sink devices include WFD devices which have the ability to render audio data received from the WFD source device 102A. The WFD source device 102A can be connected to the WFD sink devices 102B-N using a Wi-Fi Peer-to-Peer (P2P) connection. Alternatively, the WFD source device 102A can be connected to the WFD sink devices 102B-N using a tunnelled direct link setup (TDLS) connection.

Figure 2:
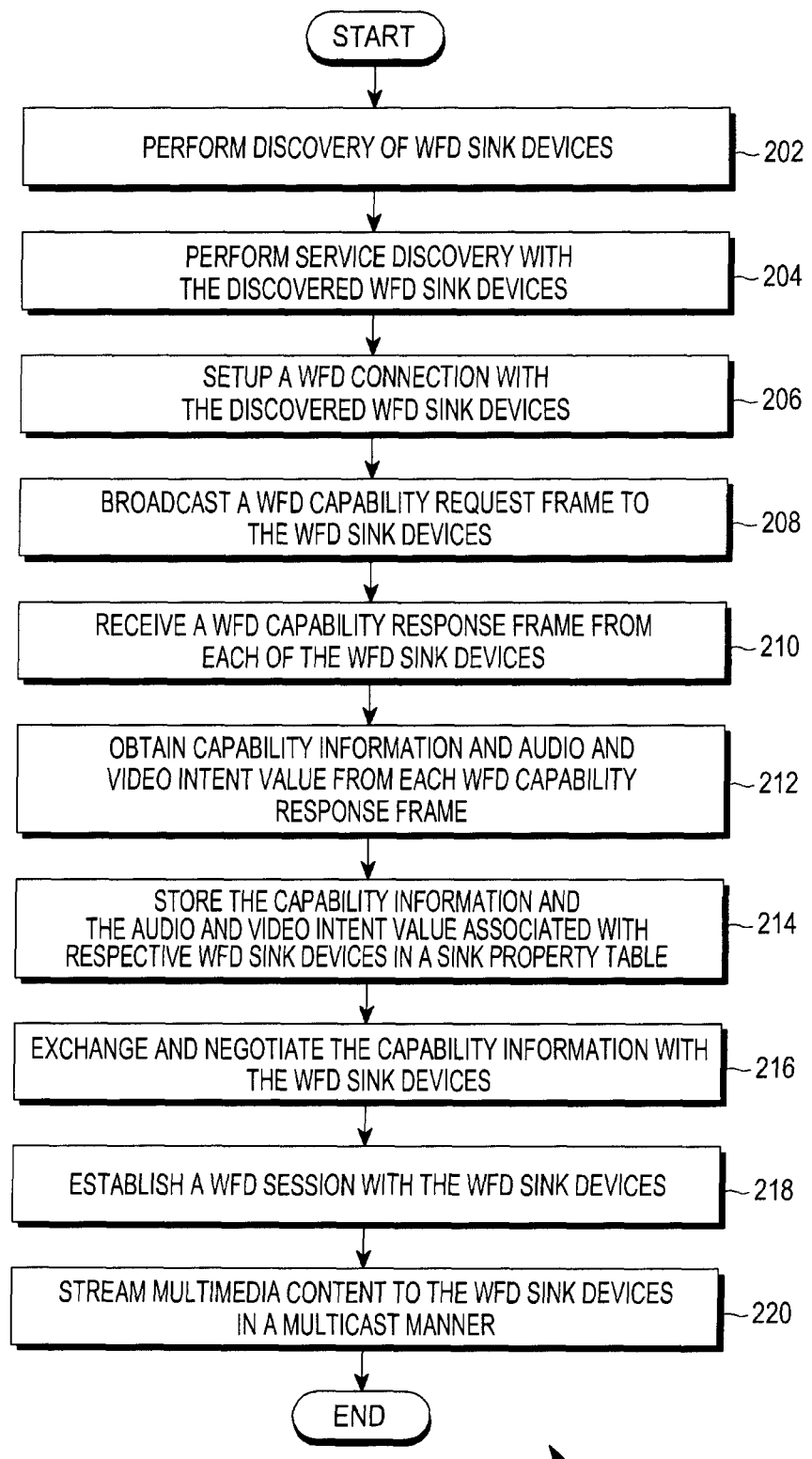
FIG. 2 is a process flowchart illustrating an exemplary method of streaming multimedia content to multiple WFD sink devices in the WFD system, according to an exemplary embodiment of the present invention.

FIG. 2 is a flowchart 200 illustrating an exemplary operation of a method of streaming multimedia content to multiple WFD sink devices 102B-N in the WFD system 100, according to an exemplary embodiment of the present invention. Referring to FIG. 2, at step 202, discovery for WFD sink devices 102B-N is performed to discover WFD sink devices that have a certain type (e.g., WFD primary sink devices and WFD secondary sink devices).

At step 204, service discovery is performed with the WFD sink devices 102B-N to determine type of services desired to be availed at the WFD sink devices 102B-N.

At step 206, a WFD connection is set up (provided) with one or more of the discovered WFD sink devices. For example, a user may select WFD sink devices from the discovered WFD sink devices prior to setting up the WFD connection via a user interface associated with the WFD source device. The WFD source device sets up a WFD connection with the selected WFD sink devices. In one exemplary embodiment, a Wi-Fi direct P2P connection is set up between the WFD source device and multiple of the discovered WFD sink devices. In another exemplary embodiment, a TDLS connection is set up between the WFD source device and the discovered WFD sink devices. The type of WFD connection set up (provided, activated, started, etc.) is based on type of protocols supported by the WFD sink devices and the WFD source device 102A.

At step 208, a WFD capability request frame is broadcasted to the WFD sink devices by the WFD source device over the WFD connection.

At step 210, a WFD capability response frame is received from each of the WFD sink devices in response to the WFD capability request frame. The WFD capability response frame contains capability information and audio and video intent value associated with the respective WFD sink device.

At step 212, the capability information and the audio and video intent value is obtained from each of the received WFD capability response frames.

Figures 7, 8:
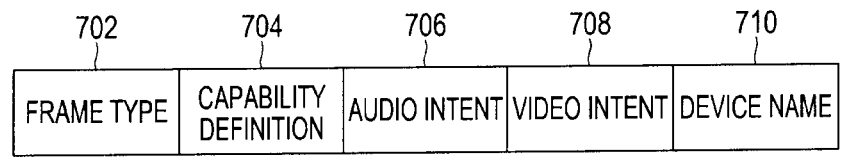
FIG. 7 is a schematic representation illustrating a frame format used for interactions between the WFD source device and the multiple WFD sink devices, according to an exemplary embodiment of the present invention.
FIG. 8 is a tabular representation of a sink property table, according to an exemplary embodiment of the present invention.

At step 214, the capability information and the audio and video intent value associated with respective WFD sink devices is stored in a sink property table. An exemplary sink property table 800 is shown in FIG. 8.

At step 216, capability information is exchanged and negotiated between the WFD source device and each of the WFD sink devices over the WFD connection. For example, capability information can be exchanged and negotiated between the WFD source device and each of the WFD sink devices, which can include audio/video parameters such as audio/video codecs, resolution, frames per second, time synchronization parameters and so on.

At step 218, a WFD session is established between the WFD source and multiple WFD sink devices. The multiple WFD sink devices preferably includes one or more WFD primary sink devices and one or more WFD secondary sink devices such that the total number of WFD sink devices involved in the WFD session is greater than or equal to two plus the WFD source device.

At step 220, multimedia content is streamed to the multiple WFD sink devices during the WFD session. In some exemplary embodiments, the multi-media content is multicast to the multiple WFD sink devices using separate real time protocol (RTP) sessions. In such exemplary embodiments, separate RTP and real time control protocol (RTCP) packets are multicast to the multiple WFD sink devices using multicast Internet Protocol (IP) addresses.

During multicasting the multimedia content, synchronization between rendering audio and video data at different WFD sink devices is maintained by a time synchronization of local clocks at the WFD devices 102A-N. This synchronization of local clocks at the WFD devices helps to preserve audio/video fidelity and compensate for jitter during rendering the multicast multimedia content. In addition, it is within the spirit and scope of the claimed invention that a grand master clock may be employed at the WFD source device 102A while each of the WFD sink devices 102B-N employs a slave clock. The master clock is computed based on round trip time with the WFD sink devices 102B-N. The WFD sink devices 102B-N can achieve time synchronization with the grand master clock at the WFD source device 102A by exchanging 802.11v timing measurement messages with the WFD source device 102A. It is appreciated that, in this particular exemplary embodiment, the present invention uses time synchronization mechanism as per IEEE STD 802.1AS specification.

Figure 3A:
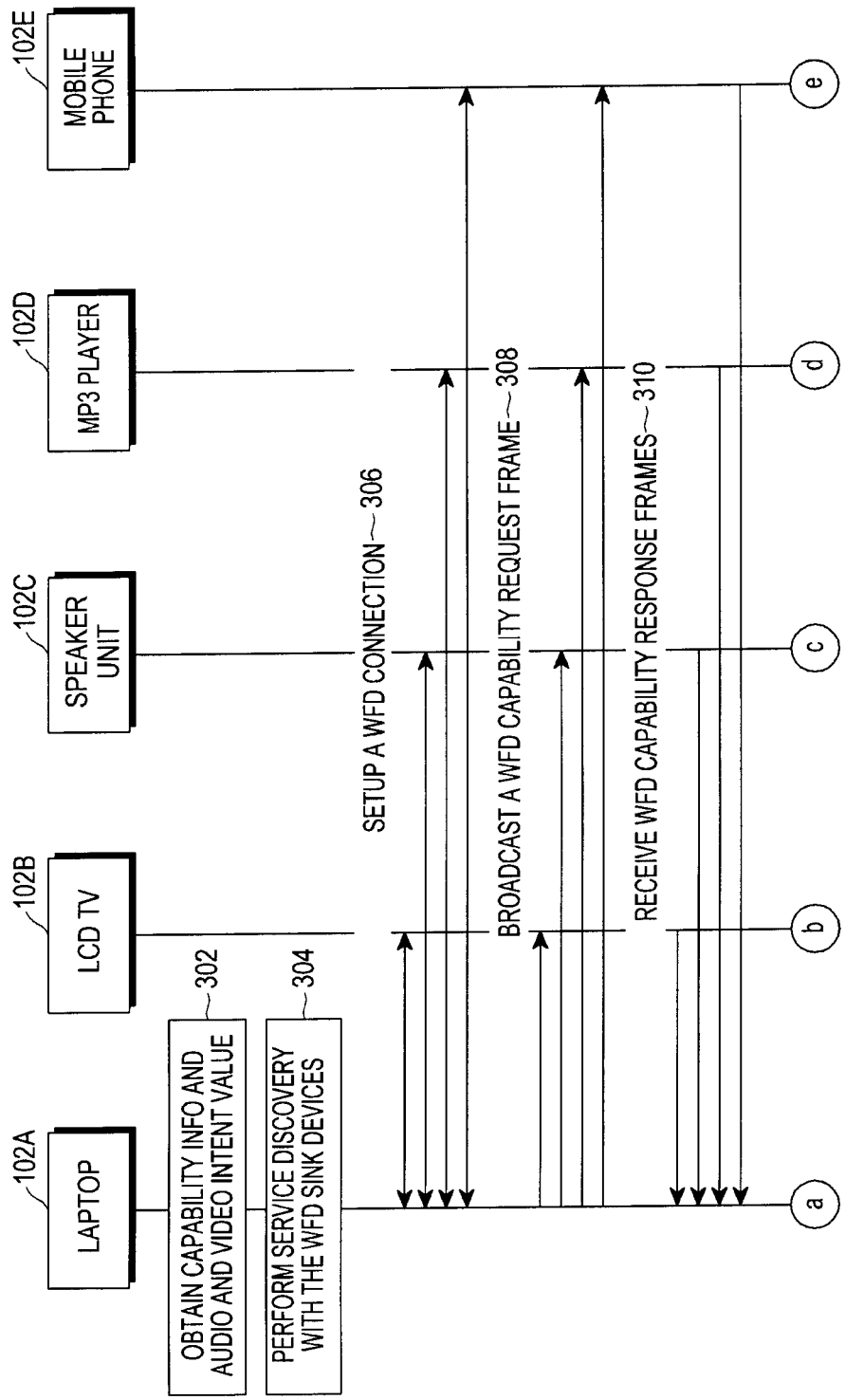
FIG. 3A is a sequence diagram depicting example of interactions between a WFD source device and multiple WFD sink devices for multicasting multimedia streaming content, according to an exemplary embodiment of the present invention.
Figure 3B:
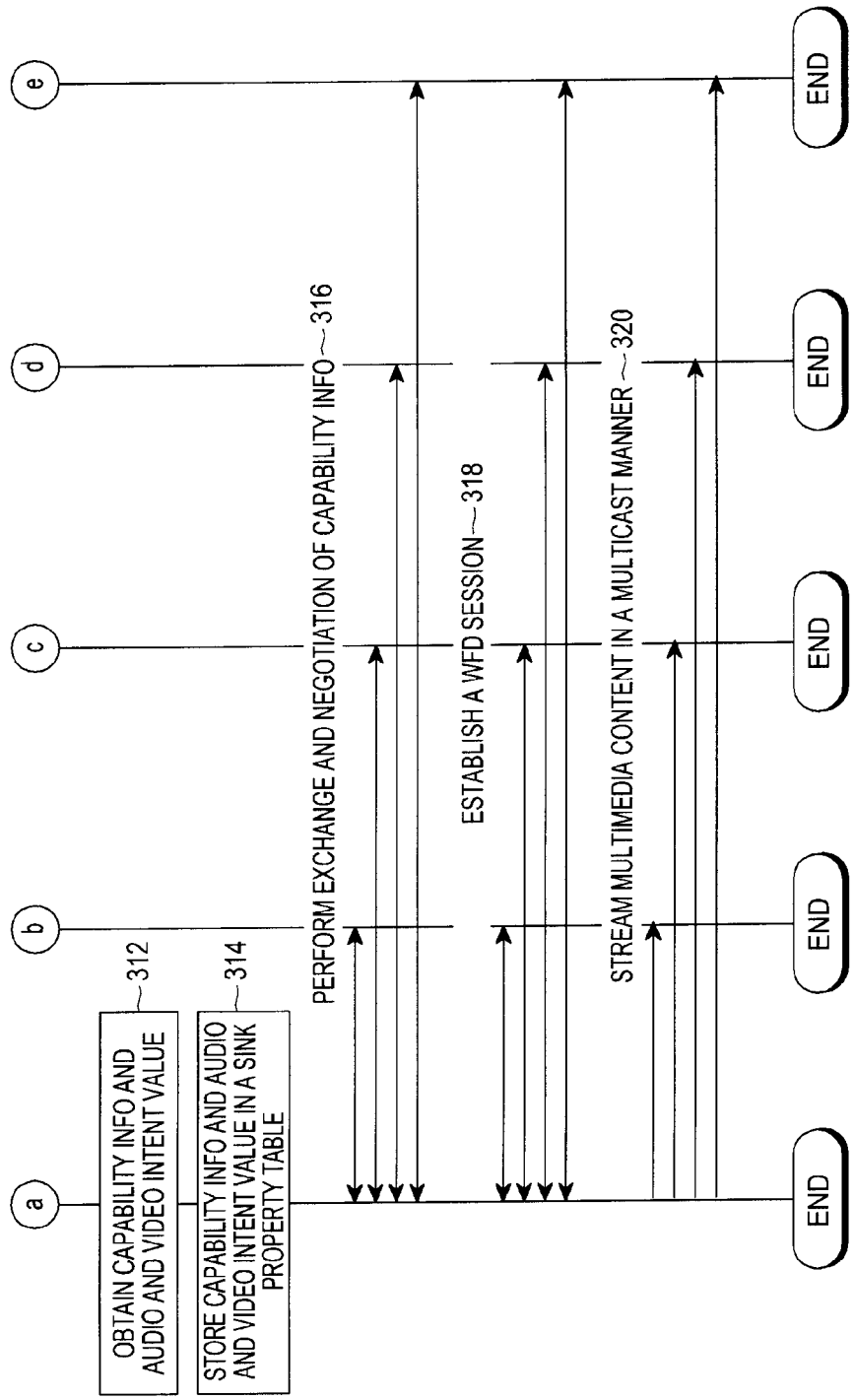
FIG. 3B is a sequence diagram depicting example of interactions between a WFD source device and multiple WFD sink devices to multicast video content and unicast audio content, according to another exemplary embodiment of the present invention.

FIGS. 3A and 3B are sequence diagrams 300 depicting examples of interactions between the WFD source device 102A and multiple WFD sink devices 102B-E. In the case of FIG. 3A, the interaction is for multicasting multimedia streaming content, according an exemplary embodiment of the present invention. For illustrative purposes of this example, consider that the WFD system 100 comprises five WFD devices 102A-E, where the WFD device 102A is a WFD source device and the remaining WFD devices 102B-E are WFD sink devices. Also, consider that, the WFD source device 102A in this particular example is a laptop computer and the WFD sink devices 102B-E in this particular example are Liquid Crystal Display television (LCD TV), speaker device, a MPEG-1 or MPEG-2 Audio Layer III (MP3) player, and a mobile phone. The LCD TV 102B and the mobile phone 102E are WFD primary sink devices (i.e., adapted for rendering audio and video data) while the speaker unit 102C and the MP3 player 102D are WFD secondary sink devices (i.e., adapted for rendering audio data). The sequence diagram 300 depicts process steps performed for multicast streaming of multimedia content to the WFD sink devices 102B-E by the WFD source device 102A.

At step 302 (FIG. 3A), the laptop 102A performs discovery of WFD sink devices 102B-E of a certain type. At the end of the discovery of sink devices at step 302, the laptop 102A discovers the presence of the LCD TV 102B, the speaker unit 102C, the MP3 player 102D, and the mobile phone 102E in a WFD network. At step 304, the laptop 102A performs service discovery to determine the type(s) of services desired to be availed at the WFD sink devices 102B-E.

At step 306, the laptop 102A sets up a WFD connection with preferably with each of the LCD TV 102B, the speaker unit 102C, the MP3 player 102D and the mobile phone 102E.

At step 308, the laptop 102A broadcasts a WFD capability request frame to the LCD TV 102B, the speaker unit 102C, the MP3 player 102D, and the mobile phone 102E that are received by the WFD sink devices 102B-D over the WFD connection.

At step 310, each of the WFD sink devices sends a WFD capability response frame to the laptop 102A in response to the WFD capability request frame. The WFD capability response frame contains capability information and audio and video intent value associated with the respective WFD sink devices. For example, the capability information in the WFD capability response frame received from the LCD TV 102B may indicate that the LCD TV 102B is able to render both audio and video data. Whereas, the capability information in the WFD capability response frame received from the speaker unit 102C may indicate that the speaker unit 102C is only able to render audio data, or even possibly audio data of a certain format.

Now with reference to FIG. 3B, at step 312, the laptop 102A obtains the capability information and the audio and video intent value from each of the received WFD capability response frames.

At step 314, the laptop 102A consolidates a sink property table using the capability information and the audio and video intent value associated with respective WFD sink devices 102B-E.

At step 316, the laptop 102A performs an exchange and negotiation of capability information with each of the WFD sink devices 102B-E over the WFD connection.

At step 318, the laptop 102A establishes a WFD session with the LCD TV 102B, the speaker unit 102C, the MP3 player 102D, and the mobile phone 102E. A artisan should understand and appreciate that, the laptop 102A establishes separate real-time streaming protocol (RSTP) control sessions with the LCD TV 102B, the speaker unit 102C, the MP3 player 102D, and the mobile phone 102E for handling RTSP commands such as SETUP, PLAY, PAUSE, and TEARDOWN.

At step 320, the laptop 102A streams multimedia content to the WFD sink devices in a multicast manner using real time protocol. For example, the laptop 102A streams video and audio data to the LCD TV 102B and the mobile phone 102E and streams only audio data to the speaker unit 102C and the MP3 player 102D.

Figure 3C:
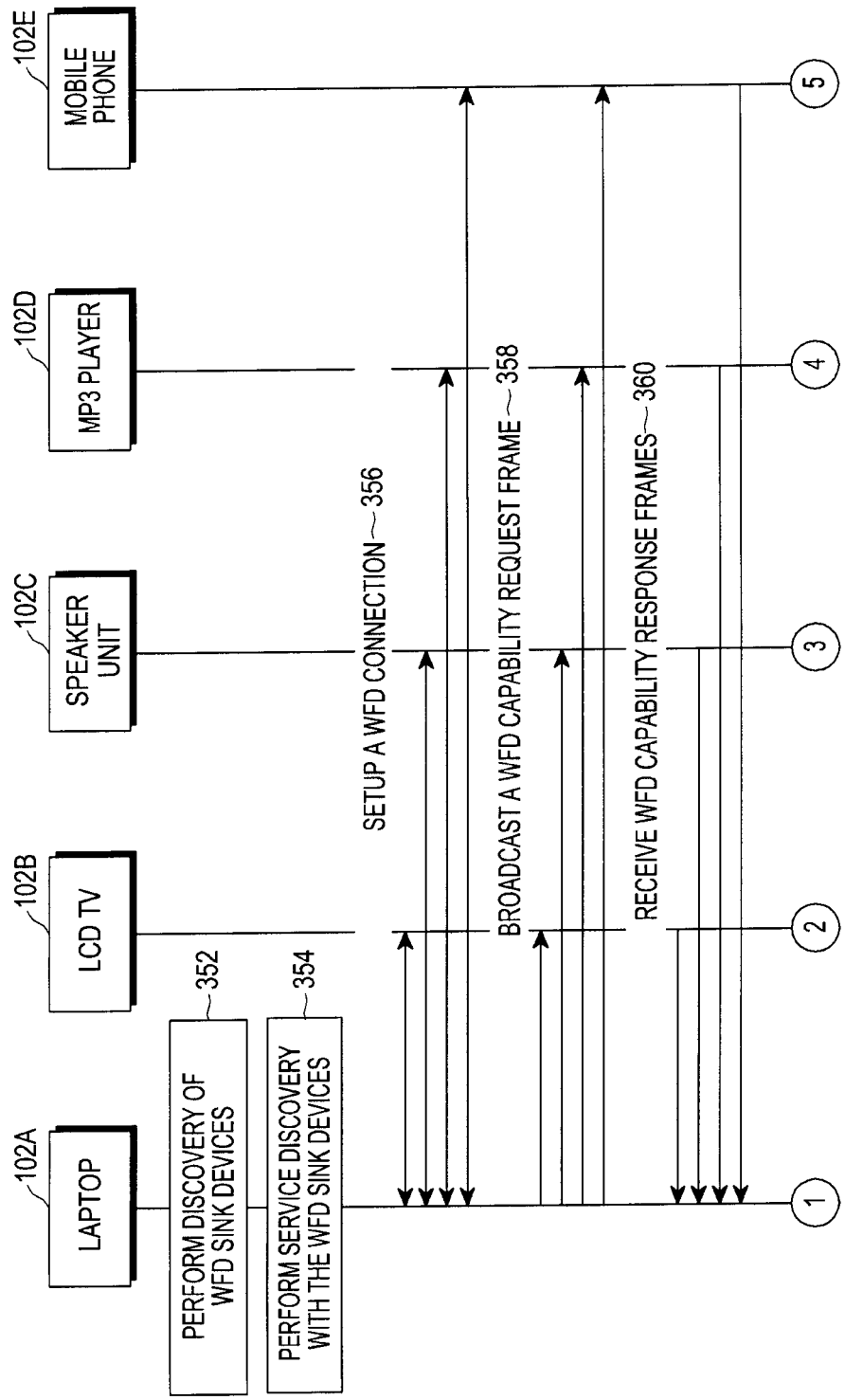

FIG. 3C is a sequence diagram 350 depicting example of interactions between the WFD source device 102A and multiple WFD sink devices 102B-E to multicast video content and unicast audio content, according to another exemplary embodiment of the present invention.

At step 352, the laptop 102A performs discovery of WFD sink devices 102B-E of certain type. At step 352, the laptop 102A discovers the presence of the LCD TV 102B, the speaker unit 102C, the MP3 player 102D, and the mobile phone 102E in a WFD network.

At step 354, the laptop 102A performs service discovery to determine type of services desired to be availed at the WFD sink devices 102B-E.

At step 356, the laptop 102A setups a WFD connection with each of the LCD TV 102B, the speaker unit 102C, the MP3 player 102D and the mobile phone 102E.

At step 358, the laptop 102A broadcasts a WFD capability request frame to the LCD TV 102B, the speaker unit 102C, the MP3 player 102D, and the mobile phone 102E over the WFD connection.

At step 360, each of the WFD sink devices 102B-E sends a WFD capability response frame to the laptop 102A in response to the WFD capability request frame. The WFD capability response frame contains capability information and audio and video intent value associated with the respective WFD sink devices 102B-E. For example, the capability information in the WFD capability response frame received from the LCD TV 102B and the mobile phone 102E may indicate that the LCD TV 102B and the mobile phone 102E are adapted to render audio and video data and/or possible certain or preferred formats of audio and video data. Whereas, the capability information in the WFD capability response frame received from the speaker unit 102C and the MP3 player 102D can indicate that the speaker unit 102C and the MP3 player 102D are adapted for rendering audio data, or certain formats of audio data.

Now referring to FIG. 3D, at step 362, the laptop 102A obtains the capability information and the audio and video intent value from each of the received WFD capability response frames.

At step 364, the laptop 102A consolidates a sink property table using the capability information and the audio and video intent value associated with each respective WFD sink devices 102B-E.

At step 366, the laptop 102A selects an audio renderer device (e.g., the speaker unit 102C) from the WFD sink devices 102C and 102D based on the audio and video intent information in the sink property table. In some exemplary embodiments, the laptop 102A selects a single audio renderer device based on an input from the user. The process step of selecting a single audio renderer device from a set of audio renderer devices is explained in greater detail in FIG. 4. At step 368, the laptop 102A broadcasts a WFD audio renderer announcement frame which indicates selection of the speaker unit 102C for a WFD session. At step 370, the laptop 102A updates the sink property table based on the selection of the speaker unit 102C. For example, the laptop 102A updates the sink property table by deleting capability information and the audio and video intent value of the MP3 player 102D from the sink property table.

At step 372, the laptop 102A performs exchange and negotiation of capability information with each of the WFD sink devices 102B-C and 102E over the WFD connection. At step 373, the laptop 102A establishes a WFD video session with the LCD TV 102B, and the mobile phone 102E and a WFD audio session with the speaker unit 102C. It can be noted that, the laptop 102A establishes separate RSTP control sessions with the LCD TV 102B, the speaker unit 102C, and the mobile phone 102E for handling RTSP commands such as SETUP, PLAY, PAUSE, and TEARDOWN. At step 374, the laptop 102A multicasts video content to the LCD TV 102B and the mobile phone 102E during the WFD video session, and unicasts audio content to the speaker unit 102C during the WFD audio session.

Figure 3E:
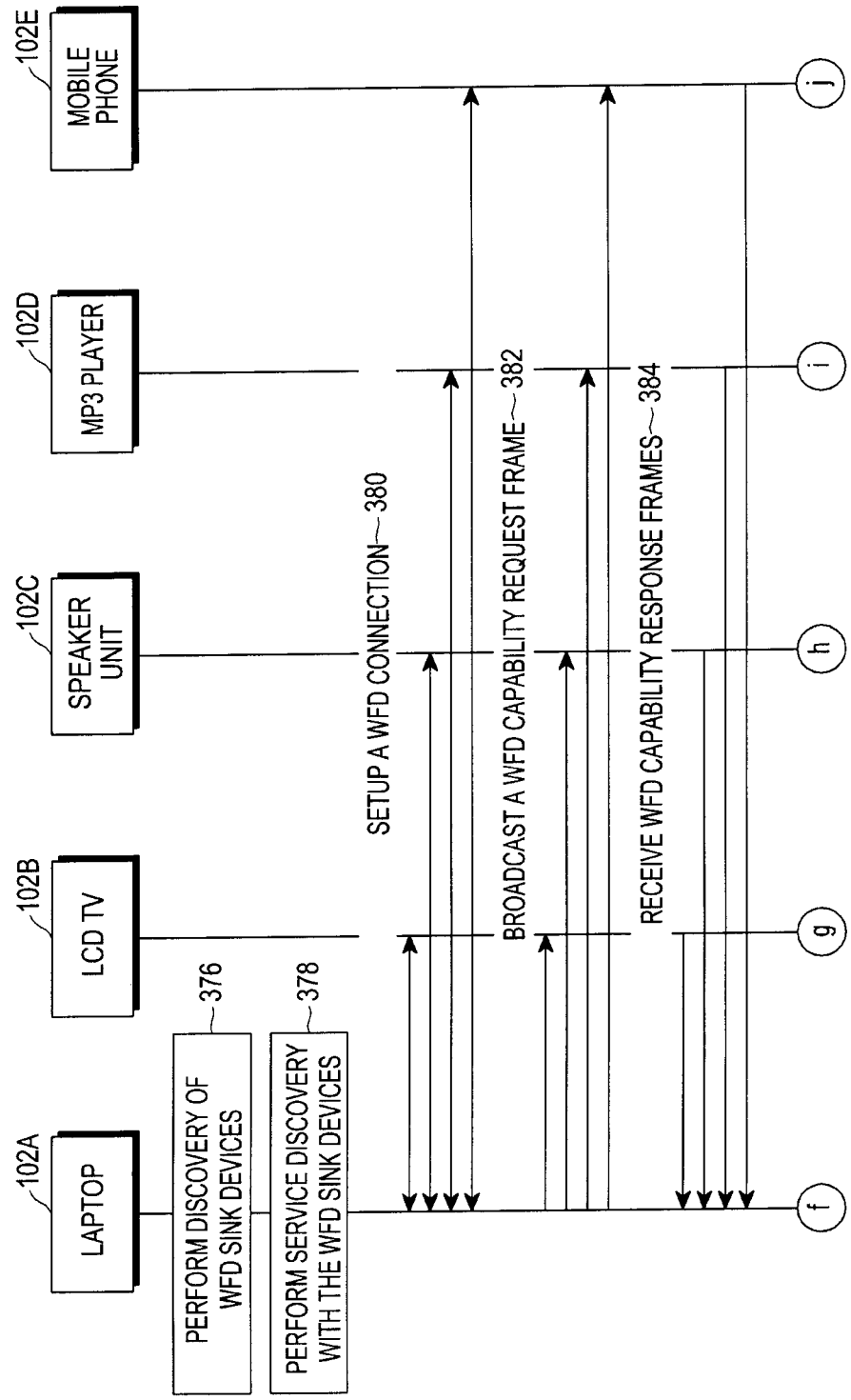
FIG. 3E is a sequence diagram 375 depicting example interactions between the WFD source device 102A and multiple WFD sink devices 102B-E to multicast audio content and unicast video content, according to yet another exemplary embodiment of the present invention.

FIG. 3E is a sequence diagram 375 depicting example interactions between the WFD source device 102A and multiple WFD sink devices 102B-E to multicast audio content and unicast video content, according to yet another exemplary embodiment of the present invention. At step 376, the laptop 102A performs discovery of WFD sink devices 102B-E of certain type. At the end of step 376, the laptop 102A discovers presence of the LCD TV 102B, the speaker unit 102C, the MP3 player 102D, and the mobile phone 102E in a WFD network. At step 378, the laptop 102A performs service discovery to determine type of services desired to be availed at the WFD sink devices 102B-E.

At step 380, the laptop 102A setups a WFD connection with the LCD TV 102B, the speaker unit 102C, the MP3 player 102D and the mobile phone 102E.

At step 382, the laptop 102A broadcasts a WFD capability request frame to the LCD TV 102B, the speaker unit 102C, the MP3 player 102D, and the mobile phone 102E over the WFD connection.

At step 384, each of the WFD sink devices 102B-E sends a WFD capability response frame to the laptop 102A in response to the WFD capability request frame. The WFD capability response frame contains capability information and audio and video intent value associated with the respective WFD sink devices 102B-E.

For example, the capability information in the WFD capability response frame received from the LCD TV 102B and the mobile phone 102E may indicate that the LCD TV 102B and the mobile phone 102E are capable of rendering audio and video data. Whereas, the capability information in the WFD capability response frame received from the speaker unit 102C and the MP3 player 102D may indicate that the speaker unit 102C and the MP3 player 102D are capable of rendering audio data.

Figure 3F:
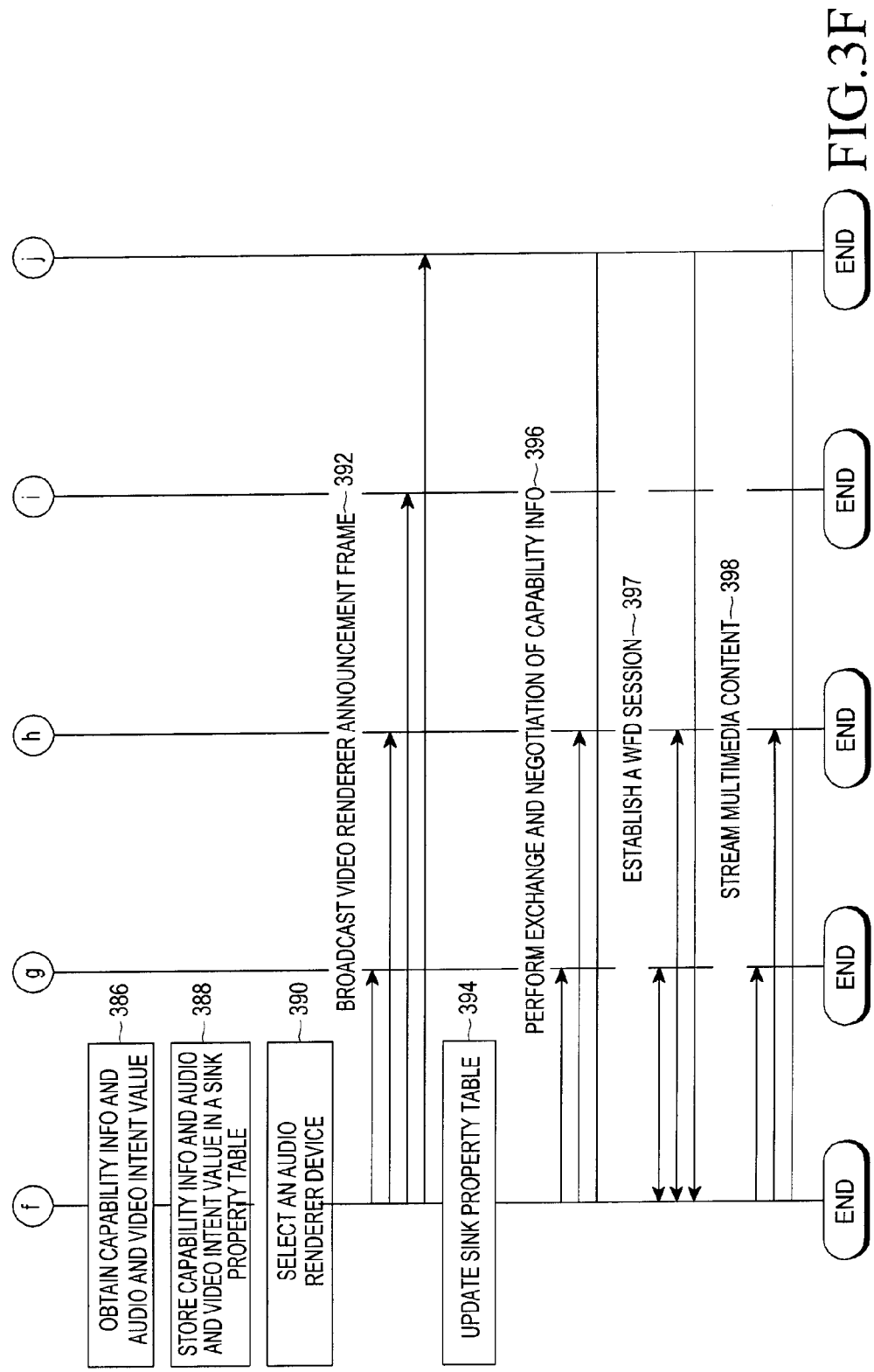
FIG. 3F is a continuation of the sequence diagram 375 of FIG. 3E, in which in part a broadcast of a video renderer announcement frame and streaming of multimedia content along with an update of a sink property table.

Now referring to FIG. 3F which is a continuation of the sequence diagram 375, at step 386, the laptop 102A obtains the capability information and the audio and video intent value from each of the received WFD capability response frames.

At step 388, the laptop 102A consolidates a sink property table using the capability information and the audio and video intent value associated with respective WFD sink devices 102B-E.

At step 390, the laptop 102A selects a video renderer device (e.g., the LCD TV 102B) from the WFD sink devices 102B and 102E based on the audio and video intent information in the sink property table. In some exemplary embodiments of the present invention, the laptop 102A selects a single video renderer device based on an input from the user. The process step of selecting a single video renderer device from a set of video renderer devices is explained in greater detail in FIG. 4.

At step 392, the laptop 102A broadcasts a WFD video renderer announcement frame which indicates selection of the LCD TV 102B for a WFD session.

At step 394, the laptop 102A updates the sink property table based on the selection of the LCD TV 102B. For example, the laptop 102A updates the sink property table by deleting capability information and the audio and video intent value of the mobile phone 102E from the sink property table.

At step 396, the laptop 102A performs exchange and negotiation of capability information with each of the WFD sink devices 102B and 102C-D over the WFD connection.

At step 397, the laptop 102A establishes a WFD video session with the LCD TV 102B and a WFD audio session with the speaker unit 102C and the MP3 player 102D. An artisan should appreciate that, the laptop 102A establishes separate RSTP control sessions with the LCD TV 102B, the speaker unit 102C, and the MP3 player 102D for handling RTSP commands such as SETUP, PLAY, PAUSE, and TEARDOWN.

At step 398, the laptop 102A multicasts audio content to the speaker unit 102C and the MP3 player 102D during the WFD audio session, and unicasts video content to LCD TV 102D during the WFD video session.

Figure 4:
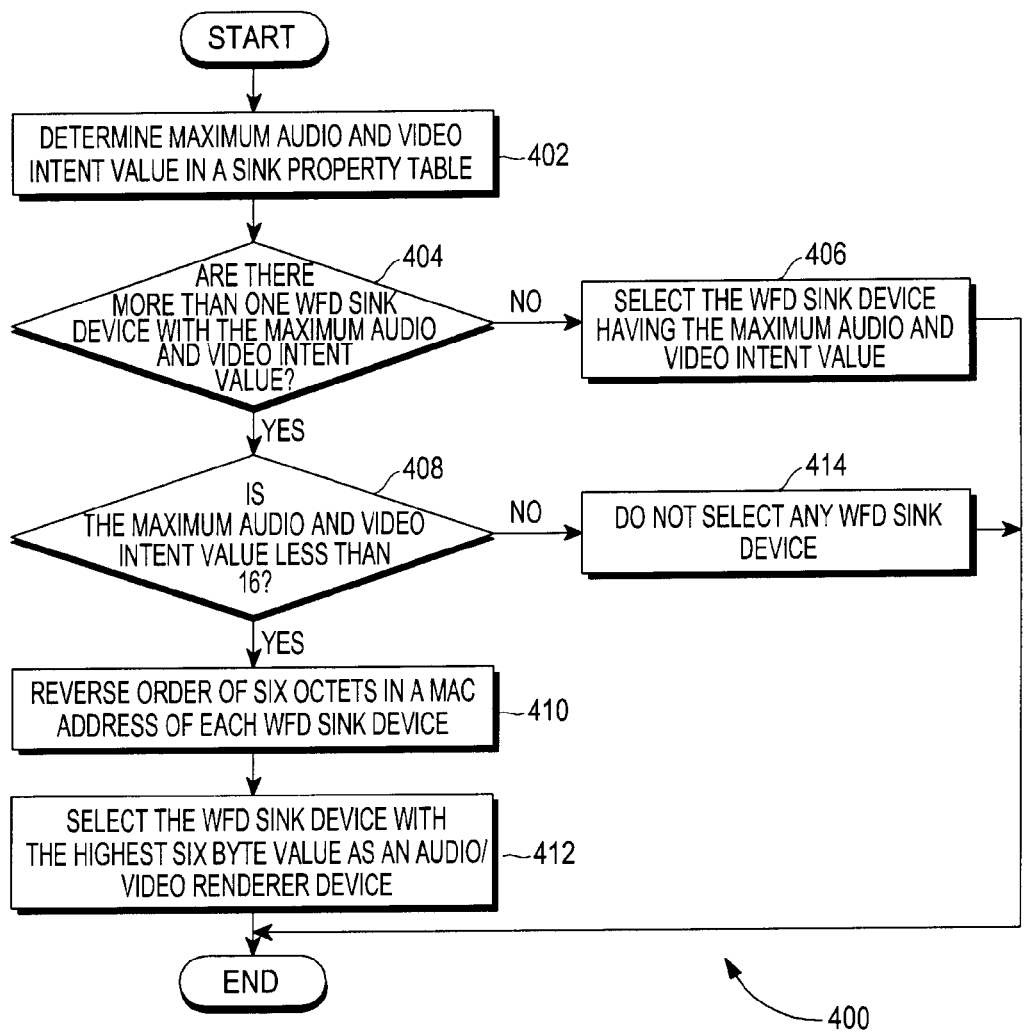
FIG. 4 is a process flowchart illustrating an exemplary operation of selecting a video/audio renderer device from the multiple WFD sink devices for unicasting audio/video data, according to an exemplary embodiment of the present invention.

FIG. 4 is a process flowchart 400 illustrating an exemplary method of selecting a video/audio renderer device from the WFD sink devices for unicasting audio/video data, according to an exemplary embodiment of the present invention. The process flowchart 400 explains steps involved in selecting a WFD primary sink device or a WFD secondary sink device by a WFD source device when a user wishes to unicast audio content or video content to an audio capable WFD sink device or a video capable WFD sink device and multicast video content or audio content to a video capable WFD sink device or an audio capable WFD sink device.

Upon consolidating the sink property table, at step 402, a maximum audio and video intent value in the sink property table is determined based on the audio and video intent values in the sink property table.

At step 404, it is determined whether there is more than one WFD sink device in the WFD system 100 with the maximum audio and video intent value. If there is a WFD sink device with the maximum audio and video intent value, then the WFD sink device having the maximum audio and video intent value is selected as an audio/video renderer device, at step 406.

If at 404 there is more than one WFD sink device with the maximum audio and video intent value, then at step 408, it is determined whether the maximum audio and video intent value is less than 16.

If at 408 the maximum audio and video intent value is less than 16, then at step 410, an order of six octets of a medium access control (MAC) address of each WFD sink device is reversed.

At step 412, the WFD sink device with a highest six byte values is selected as an audio/video renderer device.

However, If at step 408, it is determined that the maximum audio and video intent value is less than 16, then at step 414, no WFD sink device is selected as an audio/video renderer device.

Figure 5:
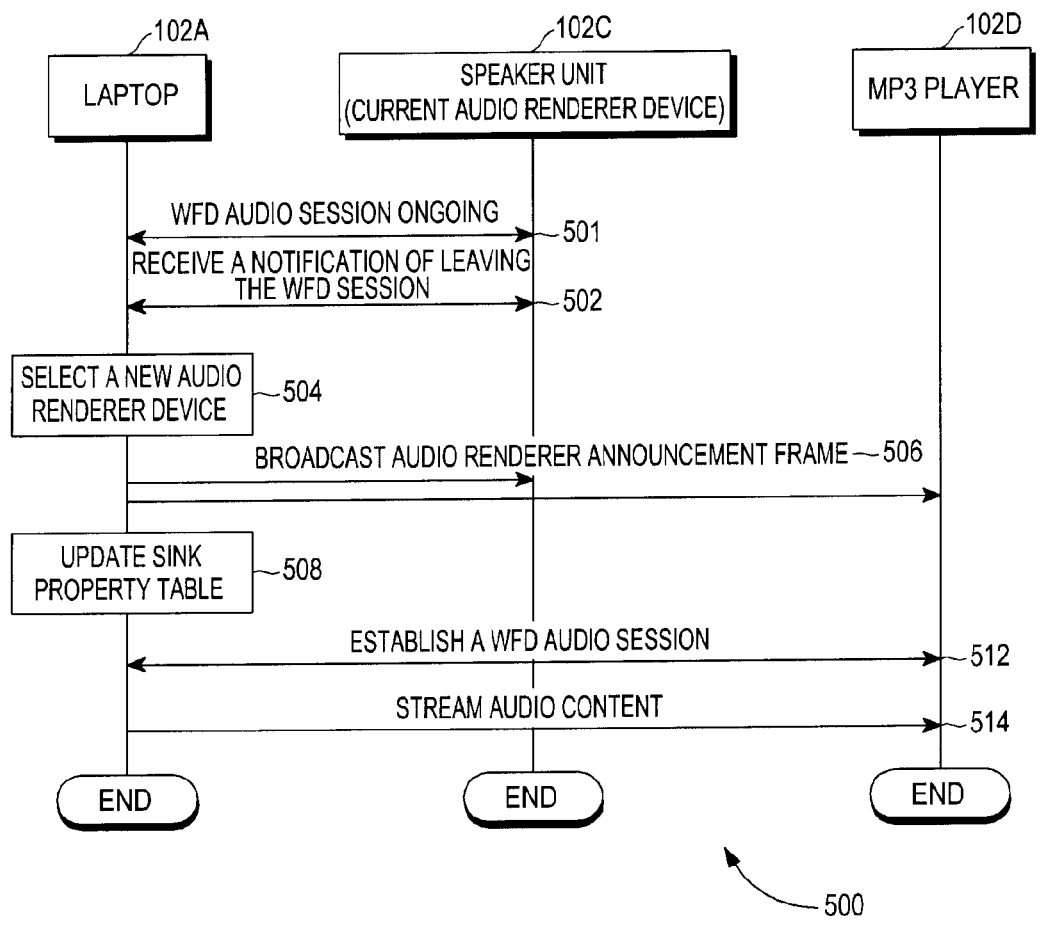
FIG. 5 is a sequence diagram illustrating an exemplary method of selection an audio renderer device when the existing audio renderer device leaves the ongoing WFD session, according to an exemplary embodiment of the present invention.

FIG. 5 is a sequence diagram 500 illustrating an exemplary method of selection an audio renderer device when the existing audio renderer device leaves the ongoing WFD session, according to an exemplary embodiment of the present invention. During an ongoing WFD session, if the existing audio renderer device (e.g., the speaker unit 102C) leaves the WFD session, the laptop 102A receives a notification indicating that the speaker unit 102C is leaving the WFD session at step 502.

At step 504, the laptop 102A selects a new audio renderer device (e.g., the MP3 player 102D) based on the audio and video intent information in the sink property table. It should be noted that the laptop 102A selects another audio renderer device by performing the steps of FIG. 4.

At step 506, the laptop 102A broadcasts a WFD audio renderer announcement frame which indicates selection of the MP3 player 102D for the WFD session.

At step 508, the laptop 102A updates the sink property table based on the selection of the MP3 player 102D. For example, the laptop 102A updates the sink property table by deleting capability information and the audio and video intent value of the speaker unit 102C from the sink property table.

At step 510, the laptop 102A establishes a WFD audio session with the MP3 player 102D.

At step 512, the laptop 102A streams audio content to the MP3 player 102D during the WFD audio session substantially simultaneously with multicasting video data to the LCD TV 102B and the mobile phone 102E. An artisan should understand and appreciate that, the same method steps are performed by the laptop 102A when the LCD TV 102B (when selected as video renderer device) leaves the ongoing WFD video session. In such case, the laptop 102A selects the mobile phone 102E as another audio renderer device based on the audio and video intent value in the sink property table.

Figure 6:
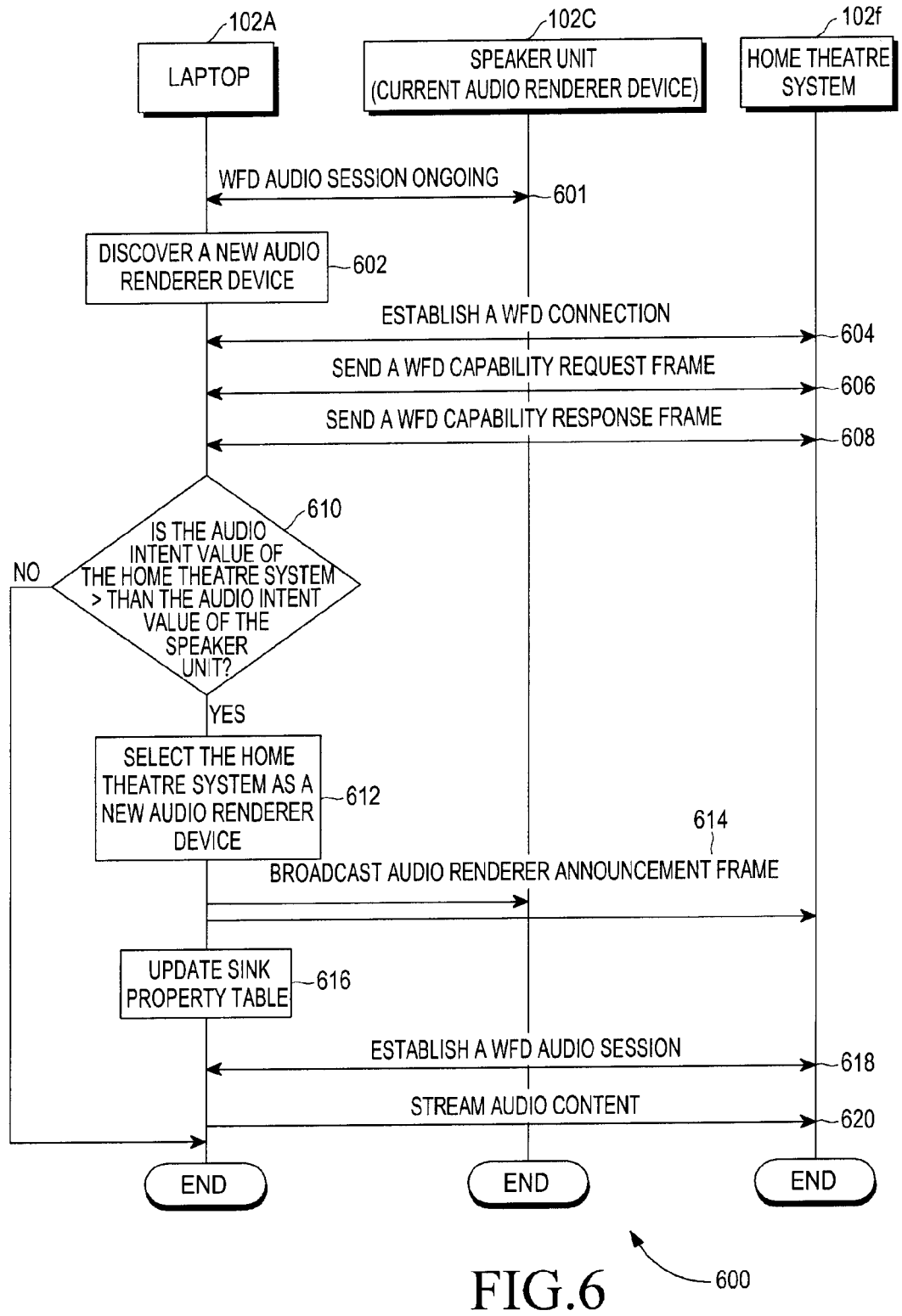
FIG. 6 is a sequence diagram illustrating an exemplary method of performing selection of audio renderer device when a new audio renderer device joins the ongoing WFD session, according to an exemplary embodiment of the present invention.

FIG. 6 is a sequence diagram 600 illustrating an exemplary method of performing selection of audio renderer device when a new audio renderer device joins the ongoing WFD session, according to an exemplary embodiment of the present invention.

At step 602, during an ongoing WFD session, a WFD source device (e.g., the laptop 102A) discovers a new audio renderer device (e.g., a home theatre system 102F) during the ongoing WFD session.

At step 604, the laptop 102A establishes a WFD connection with the home theatre system 102F.

At step 606, the laptop 102A sends a WFD capability request frame to the home theatre system 102F.

At step 608, the home theatre system 102F sends a WFD capability response frame including capability information and audio and video intent value back to the laptop 102A.

At step 610, the laptop 102A determines whether or not the audio intent value associated with the home theatre system 102F is greater than the audio intent value associated with the speaker unit 102C (e.g., the existing audio renderer device).

If at step 610 the laptop 102 has determined that the home theatre system 102F has higher audio intent value, then at step 612, the laptop 102A selects the home theatre system 102F as a new audio renderer device. If the laptop 102 has determined that audio intent value of the home theatre system 102F has less than or equal to audio intent value of the speaker unit 102C, ends selecting process of the audio renderer device.

At step 614, the laptop 102A broadcasts a WFD audio renderer announcement frame which indicates selection of the home theatre system 102F for the WFD session. At step 616, the laptop 102A updates the sink property table based on the selection of the home theatre system 102F. For example, the laptop 102A updates the sink property table by adding capability information and the audio and video intent value of the home theatre system 102F to the sink property table.

With continued reference to FIG. 6, at step 618, the laptop 102A establishes a WFD audio session with the home theatre system 102F.

At step 620, the laptop 102A streams audio content to the home theatre system 102F during the WFD audio session substantially simultaneously with multicasting video data to the LCD TV 102B and the mobile phone 102E. An artisan should understand and appreciate that, the same method steps are performed by the laptop 102A when a new video renderer device (e.g., another laptop) wishes to join the ongoing WFD video session.

FIG. 7 is a schematic representation illustrating a frame format 700 used for interactions between the WFD source device 102A and the multiple WFD sink devices 102B-N, according to an exemplary embodiment of the present invention. The frame format 700 includes a frame type field 702, a capability definition field 704, an audio intent value field 706, a video intent value field 708, and a device name 710. The frame type field 702 includes a value indicating frame type.

For example, if the frame type field 702 includes a value '00', then it implies that the frame is a WFD capability request frame. If the frame type field 702 includes a value '01', then it implies that the frame is a WFD capability response frame. If the frame type field 702 includes a value '10', then it implies that the frame is a WFD audio/video renderer announcement frame. If the frame type field 702 includes a value '11', then it implies that the frame is an invalid frame. The size of the frame type field is 2 bits.

The capability definition field 704 includes a value indicating capability of a WFD device. The size of the capability definition field 704 is 3 bits. For example, if the capability definition field 704 includes a value "000", then it preferably indicates in this example that the WFD device is a WFD source device. If the capability definition field 704 includes a value "001", then it preferably indicates in this example that the WFD device is a WFD secondary sink device capable of rendering audio data. If the capability definition field 704 includes a value "010", then it preferably indicates in this example that the WFD device is a WFD primary sink device capable of rendering video data. If the capability definition field 704 includes a value "011", then it preferably indicates in this example that the WFD device is a WFD primary sink device capable of rendering audio and video data. If the capability definition field 704 includes a value "100", then it preferably indicates in this example that the WFD device is a multimedia control WFD device. If the capability definition field 704 includes a value "110", then it preferably indicates in this example that the device is a non-WFD device.

The audio intent value field 706 indicates audio intent value associated with a WFD sink device and is of size 4 bits. The audio intent value may range from '0' to '15'. For example, the audio intent value field 706 set to value '0' this value preferably indicates in this example that the WFD sink device is not capable of rendering audio data. The video intent value field 708 indicates that video intent value associated with a WFD sink device and is of size 4 bits. The video intent value may range from '0' to '15'. For example, the video intent value field 708 set to value '0' preferably indicates in this example that the WFD sink device is not capable of rendering video data. The device name field 710 includes name of the WFD device and is of size 32 bytes. The device name may include sender's name if the frame is a WFD capability request frame or a WFD capability response frame. When the frame is a WFD audio/video renderer announcement frame, then the device name may include the name of the selected audio/video renderer device.

FIG. 8 is a tabular representation of a sink property table 800, according to another exemplary embodiment of the present invention. The sink property table 800 includes an audio intent field 802, a video intent field 804, a capability field 806, a role field 808, an availability field 810, an audio codecs field 812, and a video codecs field 814. The audio intent field 802 indicates in this example an audio intent value associated with each WFD sink device connected to the WFD source device. The audio intent value is computed a WFD sink device based on audio parameters such as audio codec, bit rate, audio channel and so on supported by said each WFD sink device. The audio intent value can be any value between '0' to '15' in this example. For example, if the audio intent field 802 indicates a value '0', then in this example it indicates that the corresponding WFD sink device is capable of rendering video data. The video intent field 804 indicates a video intent value associated with each WFD sink device wirelessly connected to the WFD source device.

The video intent value is computed by each respective WFD sink device based on video parameters such as video codec, resolution and so on supported by said each WFD sink device. The video intent value can be value between '0' to '15' in this example. For example, if the video intent field 802 indicates a value '0', then it indicates in this example that the corresponding WFD sink device is capable of rendering audio data. The capability field 806 indicates audio and/or video capability of each WFD sink device connected to the WFD source device. For example, if a WFD sink device is capable of rendering audio data, the capability field 806 corresponding to the WFD sink device includes a value 'A' in this example. Similarly, if the WFD sink device is capable of rendering video data, the capability field 806 corresponding to the WFD sink device includes a value 'V' in this example. If the WFD sink device is capable of rendering both audio and video data, the capability field 806 corresponding to the WFD sink device includes a value 'AV' in this example. The role field 808 indicates current role of each WFD sink device in the ongoing WFD session. The value 'V' in the role field 808 indicates that a WFD sink device is acting as a video rendering device while the value 'A' in the role indicates that a WFD sink device is acting as an audio renderer device. The availability field 810 indicates whether a WFD sink device is available for a WFD session. The audio codecs field 812 contains a list of audio codecs associated with each WFD sink device which are obtained during capability negotiation phase. The video codecs field 814 contains a list of video codecs associated with each WFD sink device which are obtained during capability negotiation phase.

Figure 9:
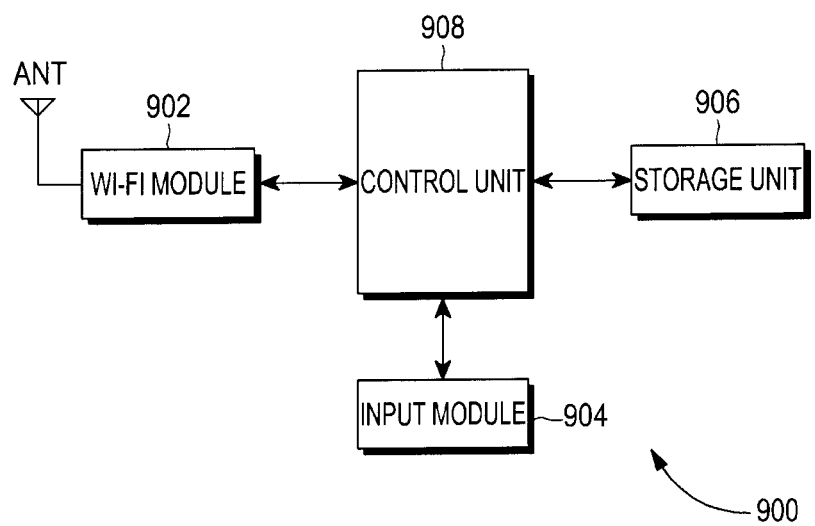
FIG. 9 is a block diagram of a WFD device in the Wi-Fi system of FIG. 1, according to an exemplary embodiment of the present invention.

FIG. 9 is a block diagram of a Wi-Fi Display (WFD) device 900 in the Wi-Fi system of FIG. 1, according to exemplary embodiments of the present invention previously shown and described. It is appreciated that the WFD source device 102A and the WFD sink devices 102B-N may have the same configuration as the WFD device 900. The WFD device 900 includes a Wi-Fi transceiver module 902, an input unit 904, a storage unit 906 comprises a non-transitory machine readable medium, and a control unit 908 including hardware such as a processor or microprocessor configured for operation. Although not shown, according to type, the WFD device 900 may further include various additional hardware components, such as a display for screen data display, a radio frequency transceiver unit for mobile communication, an audio processor including a microphone and a speaker, a camera module for taking photographs, a digital broadcast receiving module for Digital Multimedia Broadcasting (DMB) or Digital Video Broadcasting (DVB), and a Bluetooth transceiver module for Bluetooth communication. These additional components are not described further for conciseness in explanation. However, under the broadest reasonable interpretation all of the components provide a statutory invention under 35 U.S.C. §101.

The Wi-Fi module 902 supports Internet Protocol (IP) based wireless communication for the WFD device 900. The input unit 904 generates an input signal corresponding to a user action and sends the input signal to the control unit 908. The input unit 904 may include a plurality of keys. In particular, the input unit 904 may include one or more buttons for generating an input signal to execute a Wi-Fi based function such as a WPS feature for connection setup between WFD devices 102A-N. Alternatively, the input unit 904 may include touch sensitive display capable of generating an input signal corresponding to a user action (e.g., tap, swipe, hover, etc.), and the input unit and a display can be a same unit, such as a thin film technology (TFT) touch-screen.

The storage unit 906 is a non-transitory machine readable medium stores various machine executable code and data for the WFD device 900. The storage unit 906 may be composed of one or more volatile memory and non-volatile memory. For example, the storage unit 906 may store an operating system of the WFD device 900, a program and data for discovering WFD devices in the WFD system 100 and establishing a WFD connection (e.g., Wi-Fi direct peer-to-peer (P2P) or tunnelled direct link setup connection), a program and data for capability exchange and negotiation, a program and data for establishing a WFD session with one or more WFD devices, a program and data for streaming of multimedia content and a program and data for controlling exchange of information on supported functions. Such programs and data may be stored semi-permanently or temporarily. In particular, the storage unit 906 may store the sink property table 800 to provide information on functions (e.g., capability, role, audio intent, video intent, audio and video codec, etc.) supported by the WFD device 900. In any event, the machine executable code is loaded into a microprocessor or processor to configure same for operation.

The control unit 908 comprises hardware configured to control the overall operation of the WFD device 900. More particularly, the control unit 908 controls an operation to provide multimedia content in a unicast as well as multicast manner. The control unit 908 may be capable of executing program and data stored in the storage unit 906 to perform steps illustrated in FIGS. 2 to 6. In some exemplary embodiments, the control unit 906 may refer to device information collected from WFD sink devices, select WFD sink devices based on associated capability information and audio and video intent value, and multicast multimedia content to the selected WFD devices. For example, in response to invocation of an application related to video playback, the control unit 908 in a WFD source device may select a LCD TV, a speaker unit, a MP3 player, and a mobile phone based on the information in the sink property table and stream audio and/or video data to the WFD devices, which then plays back the audio and/or video data based on their capabilities.

The role of the control unit 908 is described further in relation to operation control. In addition, the control unit 908 may be configured to control regular operations of the WFD device 900. For example, when an application using mobile communication is executed, the control unit 908 may control operations related to mobile communication. When an application using a local network is executed, the control unit 908 may control operations related to local networking.

The WFD device 900 of an exemplary embodiment of the present disclosure may be any form of information and communication appliance, such as a mobile communication terminal supporting a communication protocol for a communication system, a smart phone, a Portable Multimedia Player (PMP), a digital broadcast receiver, a Personal Digital Assistant (PDA), a music player such as a Moving Picture Experts Group (MPEG)-1 or MPEG-2 audio layer 3 (MP3) player or a portable game console, tablet, etc. The WFD device 900 of an exemplary embodiment of the present invention may be applied to medium to large sized devices such as a television set, a large format display, digital signage, a media kiosk, a personal computer, a laptop, a printer, a multifunction office machine, etc.

The above-described methods according to the present invention can be implemented in hardware, firmware or as software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitutes hardware in the claimed invention. Under the broadest reasonable interpretation, the appended claims constitute statutory subject matter in compliance with 35 U.S.C. §101 and none of the elements consist of software per se.

The terms "unit" or "module" as used herein is to be understood as constituting hardware such as a processor or microprocessor configured for a certain desired functionality in accordance with statutory subject matter under 35 U.S.C. §101 and does not constitute software per se.

The present exemplary embodiments have been described with reference to specific example embodiments; it will be evident that various modifications and changes may be made to these embodiments without departing from the broader spirit and scope of the various embodiments. Furthermore, the various devices, units, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of multicasting multimedia streaming content to a plurality of WFD sink devices in a Wireless Fidelity Display (WFD) network, comprising:
    setting up by a WFD source device a WFD connection for wirelessly communicating with the plurality of WFD sink devices in a WFD network;
    broadcasting by the WFD source device a WFD capability request frame to the plurality of WFD sink devices over the WFD connection;
    receiving by the WFD source device a WFD capability response frame from each of the plurality of WFD sink devices in response to the WFD capability request frame, wherein each WFD capability response frame comprises capability information and an audio and video intent value of a respective WFD sink device of the plurality of WFD sink devices, wherein the capability information includes information indicating whether the respective WFD sink device is able to render audio or video data;
    establishing by the WFD source device a WFD session with multiple WFD sink devices among the plurality of WFD sink devices based on the capability information and the audio and video intent value from respective WFD capability response frames from the multiple WFD sink devices; and
    streaming by the WFD source device multimedia content to the multiple WFD sink devices during the WFD session
    wherein establishing the WFD session with multiple WFD sink devices comprises:
        selecting by the WFD source device at least one renderer device from the plurality of WFD sink devices based on the audio and video intent value in the WFD capability response frames; and
        broadcasting by the WFD source device a WFD renderer announcement frame indicating selection of the at least one renderer device to the plurality of WFD sink devices.

2. The method of claim 1, wherein the multiple WFD sink devices comprise one or more WFD primary sink devices and one or more WFD secondary sink devices.

3. The method of claim 1, further comprising:
    obtaining by the WFD source device the capability information and the audio and video intent value from the WFD capability response frame received from each of the plurality of WFD sink devices; and
    storing by the WFD source device the capability information and the audio and video intent value associated with each of the plurality of WFD sink devices in a sink property table.

4. The method of claim 3, further comprising:
    if the selected at least one renderer device includes at least one audio renderer device, updating by the WFD source device the sink properties table based on the capability information and the audio and video intent value of the at least one audio renderer device.

5. The method of claim 4, wherein establishing by the WFD source device the WFD session with the multiple WFD sink devices among the plurality of WFD sink devices comprises:
    establishing by the WFD source device a WFD audio session with the at least one audio renderer device; and
    establishing by the WFD source device a WFD video session with at least one remainder of the multiple WFD sink devices.

6. The method of claim 3, further comprising:
    receiving by the WFD source device an indication from the at least one renderer device when the at least one audio or video renderer devices leaves the WFD session; and
    selecting by the WFD source device another renderer device from at least one reminder of the plurality of WFD sink devices based on the audio and video intent value in the sink property table; and
    broadcasting by the WFD source device another WFD renderer announcement frame indicating selection of the another renderer device to the plurality of WFD sink devices.

7. The method of claim 3, further comprising:
    if the selected at least one renderer device includes at least one video renderer device, updating by the WFD source device the sink properties table based on capability information and an audio and video intent value of the at least one video renderer device.

8. The method of claim 7, wherein establishing by the WFD source device the WFD session with the multiple WFD sink devices in the plurality of WFD sink devices comprises:

establishing by the WFD source device a WFD video session with and the at least one video renderer device if the selected at least one renderer device includes the at least one video renderer device; and establishing by the WFD source device a WFD audio session with at least one remainder of the multiple WFD sink devices.

9. The method of claim 1, wherein the WFD connection comprises a Wi-Fi Peer-to-Peer connection.

10. The method of claim 1, wherein the WFD connection comprises a tunnelled direct link set up connection.

11. The method of claim 1, wherein streaming by the WFD source device the multimedia content to the multiple WFD sink devices during the WFD session comprises:
streaming by the WFD source device multimedia content to the multiple WFD sink devices during the WFD session using multicast Internet Protocol (IP) addresses.

12. An apparatus of multicasting multimedia streaming content to a plurality of WFD sink devices in a Wireless Fidelity Display (WFD) network, comprising:
a control unit; and
a Wi-Fi module communicatively coupled to the control unit,
wherein the control unit is configured for:
setting up a WFD connection with a plurality of WFD sink devices;
broadcasting a WFD capability request frame to the plurality of WFD sink devices;
receiving via the Wi-Fi module, a WFD capability response frame comprising capability information and an audio and video intent value from each of the plurality of WFD sink devices, wherein the capability information includes information indicating whether the WFD sink device is able to render audio or video data;
establishing a WFD session with multiple WFD sink devices in the plurality of WFD sink devices based on the capability information and the audio and video intent value; and
streaming multimedia content to the multiple WFD sink devices during the WFD session,
wherein the control unit is further configured for:
selecting at least one renderer device from the plurality of WFD sink devices based on the audio and video intent value in the WFD capability response frames; and
broadcasting a WFD renderer announcement frame indicating selection of the at least one renderer device to the plurality of WFD sink devices.

13. The apparatus of claim 12, wherein the control unit is further configured for:
obtaining the capability information and the audio and video intent value from the WFD capability response frame received from each one of the plurality of WFD sink devices; and
storing the capability information and the audio and video intent value associated with each of the plurality of WFD sink devices in a sink property table.

14. The apparatus of claim 13, wherein if the selected at least one renderer device includes at least one audio renderer device, the control unit is further configured for:
updating the sink properties table based on capability information and an audio and video intent value of the at least one audio device.

15. The apparatus of claim 14, wherein the control unit is further configured for:

establishing a WFD audio session with the at least one audio renderer device if the selected at least one renderer device includes the at least one audio renderer device; and
establishing a WFD video session with at least one remainder of the multiple WFD sink devices.

16. The apparatus of claim 13, wherein the control unit is configured for:
receiving, via the Wi-Fi module, an indication indicating a leaving of the at least one renderer device when the at least one audio renderer device leaves the WFD session;
selecting another renderer device from at least one remainder of the plurality of WFD sink devices based on the audio and video intent value in the sink property table; and
broadcasting another WFD renderer announcement frame indicating selection of the another renderer device to the plurality of WFD sink devices.

17. The apparatus of claim 13, wherein if the selected at least one renderer device includes at least one video renderer device, the control unit is further configured for:
updating the sink properties table based on capability information and an audio and video intent value of the at least one video renderer device.

18. The apparatus of claim 17, wherein the control unit is further configured for:
establishing a WFD video session with the at least one video renderer device if the selected at least one renderer device includes the at least one video renderer device; and
establishing a WFD audio session with at least one remainder of the multiple WFD sink devices if the selected at least one renderer device includes at least one audio renderer device.

19. A Wireless Fidelity Display (WFD) system, comprising:
a WFD source device; and
a plurality of WFD sink devices,
wherein the WFD source device is configured to set up a WFD connection for wirelessly communicating with a plurality of WFD sink devices in a WFD network, broadcast a WFD capability request frame to the plurality of WFD sink devices over the WFD connection, receive a WFD capability response frame from each of the plurality of WFD sink devices in response to the WFD capability request frame, wherein each WFD capability response frame comprises capability information and an audio and video intent value of a respective WFD sink device of the plurality of WFD sink devices, wherein the capability information includes information indicating whether the WFD source device is able to render audio or video data, establish a WFD session with multiple WFD sink devices among the plurality of WFD sink devices based on the capability information and the audio and video intent value from respective WFD capability response frames from the multiple WFD sink device, and stream multimedia content to the multiple WFD sink devices during the WFD session, and
wherein the WFD source device is further configured to select at least one renderer device from the plurality of WFD sink devices based on the audio and video intent value in the WFD capability response frames, and broadcast a WFD renderer announcement frame indicating selection of the at least one renderer device to the plurality of WFD sink devices.

20. The system of claim 19, wherein the multiple WFD sink devices comprise one or more WFD primary sink devices and one or more WFD secondary sink devices.

* * * * *